United States Patent
Dwelley et al.

(10) Patent No.: US 7,426,374 B2
(45) Date of Patent: Sep. 16, 2008

(54) COMBINATION OF HIGH-SIDE AND LOW-SIDE CURRENT SENSING IN SYSTEM FOR PROVIDING POWER OVER COMMUNICATION LINK

(75) Inventors: David McLean Dwelley, Santa Barbara, CA (US); Jeffrey Lynn Heath, Santa Barbara, CA (US)

(73) Assignee: Linear Technology Corporation, Milpitas, CA (US)

( * ) Notice: Subject to any disclaimer, the term of this patent is extended or adjusted under 35 U.S.C. 154(b) by 540 days.

(21) Appl. No.: 11/267,261

(22) Filed: Nov. 7, 2005

(65) Prior Publication Data

US 2006/0166706 A1 Jul. 27, 2006

Related U.S. Application Data

(60) Provisional application No. 60/646,509, filed on Jan. 25, 2005.

(51) Int. Cl.
*H04B 1/04* (2006.01)
(52) U.S. Cl. ............ 455/127.1; 455/405; 455/501; 455/67.11; 455/550.1; 370/436; 370/502
(58) Field of Classification Search .......... 455/127.1, 455/403, 405, 501, 67.11, 67.13, 550.1, 114.2; 370/436, 502, 908
See application file for complete search history.

(56) References Cited

U.S. PATENT DOCUMENTS

| | | | |
|---|---|---|---|
| 6,426,947 B1* | 7/2002 | Banker et al. | 370/254 |
| 7,016,368 B2* | 3/2006 | Binder | 370/436 |
| 2004/0227522 A1 | 11/2004 | Male | |

FOREIGN PATENT DOCUMENTS

WO  WO 2004/068781  8/2004

OTHER PUBLICATIONS

"Part 3: Carrier Sense Multiple Access With Collision Detection (CSMA/CD) Access Method and Physical Layer Specifications", IEEE Std 802.3af-2003, XP-002383689.
"All You Need to Know About Power Over Ethernet (POE) and the IEEE 802.3AF Standard", Galit Mendelson, XP—002372480.
Search Report dated Nov. 10, 2006.

* cited by examiner

*Primary Examiner*—Tony T Nguyen
(74) *Attorney, Agent, or Firm*—McDermott Will & Emery LLP

(57) ABSTRACT

A system for supplying power to a load over a communication link has high-side current sensing circuitry for measuring a high-side current value, low-side current sensing circuitry for measuring a low-side current value, and control circuitry responsive to both the high-side current value and the low-side current value to detect a fault condition, detect information from the load, and/or transmit information to the load by creating a prescribed unbalance between the high-side current and the low-side current.

22 Claims, 2 Drawing Sheets

COMBINATION OF HIGH-SIDE AND LOW-SIDE CURRENT SENSING IN SYSTEM FOR PROVIDING POWER OVER COMMUNICATION LINK

This application claims priority of provisional U.S. patent application No. 60/646,509 filed on Jan. 25, 2005, and entitled "SYSTEM AND METHOD FOR SUPPORTING ADVANCED POWER OVER ETHERNET SYSTEM."

TECHNICAL FIELD

This disclosure relates to power supply systems, and more particularly, to circuitry and methodology for combining high-side and low-side current sensing in a system for providing power over a communication link, such as a Power over Ethernet (PoE) system.

BACKGROUND ART

Over the years, Ethernet has become the most commonly used method for local area networking. The IEEE 802.3 group, the originator of the Ethernet standard, has developed an extension to the standard, known as IEEE 802.3af, that defines supplying power over Ethernet cabling. The IEEE 802.3af standard defines a Power over Ethernet (PoE) system that involves delivering power over unshielded twisted-pair wiring from a Power Sourcing Equipment (PSE) to a Powered Device (PD) located at opposite sides of a link. Traditionally, network devices such as IP phones, wireless LAN access points, personal computers and Web cameras, have required two connections: one to a LAN and another to a power supply system. The PoE system eliminates the need for additional outlets and wiring to supply power to network devices. Instead, power is supplied over Ethernet cabling used for data transmission.

As defined in the IEEE 802.3af standard, PSE and PD are non-data entities allowing network devices to supply and draw power using the same generic cabling as is used for data transmission. A PSE is the equipment electrically specified at the point of the physical connection to the cabling, that provides the power to a link. A PSE is typically associated with an Ethernet switch, router, hub or other network switching equipment or midspan device. A PD is a device that is either drawing power or requesting power. PDs may be associated with such devices as digital IP telephones, wireless network access points, PDA or notebook computer docking stations, cell phone chargers and HVAC thermostats.

The main functions of the PSE are to search the link for a PD requesting power, optionally classify the PD, supply power to the link if a PD is detected, monitor the power on the link, and disconnect power when it is no longer requested or required. A PD participates in the PD detection procedure by presenting PoE detection signature defined by the IEEE 802.3af standard.

If the detection signature is valid, the PD has an option of presenting a classification signature to the PSE to indicate how much power it will draw when powered up. A PD may be classified as class 0 to class 4. A PD of class 1 requires that the PSE supplies at least 4.0 W, a PD of class 2 requires that the PSE supplies at least 7.0 W, and a PD of class 0, 3 or 4 requires at least 15.4 W. Based on the determined class of the PD, the PSE applies the required power to the PD.

When power is supplied to a load, the PSE may check for overcurrent and undercurrent conditions by monitoring its output current with respect to certain current limit thresholds, such as the maximum output current of the PSE at a short circuit condition ($I_{LIM}$), the overload current detection range ($I_{CUT}$), and the IDLE state current ($I_{Min}$). The output current of the PSE may be measured by monitoring voltage across a sense resistor coupled between a power supply lead and the load.

In a conventional PoE system, the current for each PD is measured using a single sense resistor connected to a power supply lead. For example, in the LTC®4258 Power over Ethernet Controller developed by the Linear Technology Corporation, the assignee of the current subject matter, a single sense resistor for each port is connected to a −48V power supply input.

However, to detect certain fault conditions, such as a fault in the isolation system, and to support certain advanced features of a system for supplying power over a communication link, it would be desirable to provide an advanced current sensing system that would give more information on the current between the PSE and the PD.

SUMMARY OF THE DISCLOSURE

The present disclosure offers a novel system and methodology for current sensing in a system for supplying power over a communication link. For example, the current sensing system and methodology of the present disclosure may be utilized in a PoE system. In accordance with one aspect of the disclosure, a system for supplying power over a communication link comprises high-side current sensing circuitry for measuring a high-side current value, low-side current sensing circuitry for measuring a low-side current value, and control circuitry responsive to a combination of the high-side current value and the low-side current value.

For example, in response to a difference between the high-side current value and the low-side current value, the control circuit may detect a fault condition. When the fault condition is detected, the power supplied over the communication link may be removed and/or an indication to a user may be provided.

Also, a difference between the high-side current value and the low-side current value may be used to determine information from a load, such as a type of a PD connected to the PSE. For example, the control circuitry may determine whether the PD has an earth ground connection.

Moreover, the high-side and low-side current sensing of the present disclosure may be used for supporting data transmission between the PSE and PD performed by providing a controlled unbalance between the high-side current value and the low-side current value.

In accordance with an embodiment of the disclosure, the system may comprise a power supply device, such as a PSE, for providing power over the communication link to a load. The high-side current sensing circuitry comprises an impedance connected between a load and a more positive power supply lead of a pair of power supply leads, and the low-side current sensing circuitry comprises an impedance connected between the load and a more negative power supply lead of the pair of power supply leads. The high-side current sensing circuitry and the low-side current sensing circuitry may provide DC current sensing.

In accordance with a method of the present disclosure, the following steps are carried out for supplying power over a communication link:
  sensing high-side current in high-side circuitry associated with a power supply device,
  sensing low-side current in low-side circuitry associated with the power supply device, and comparing the high-side current and the low-side current to detect a fault condition, detect information from the load, and/or transmit information to the load by creating a prescribed unbalance between the high-side current and the low-side current.

In accordance with another aspect of the disclosure, a local area network comprises at least a pair of network nodes, a network hub, and communication cabling for connecting the network nodes to the network hub to provide data communications. The network hub has a power supply device for providing power to a load over the communication cabling. The power supply device includes high-side current sensing circuitry for measuring a high-side current value and low-side current sensing circuitry for measuring a low-side current value.

A fault detecting circuit may be provided for detecting a fault if a difference between the high-side current value and the low-side current value exceeds a predetermined value. Also, the power supply device may create a controlled unbalance between the high-side current value and the low-side current value, and/or may detect such an unbalance created by the load to transmit information between the power supply device and the load.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using the example of a current sensing mechanism in a PoE system. It will become apparent, however, that the concepts described herein are applicable to current sensing in any system for providing power over a communication link. For example, the current sensing circuitry of the present disclosure may be provided in a local area network (LAN) having a plurality of nodes, a network hub and communication cabling connecting the nodes to the network hub for providing data communications. The network hub may include a power supply device, and the communication cabling may be utilized for supplying power from the power supply device to a load.

Figure 1:
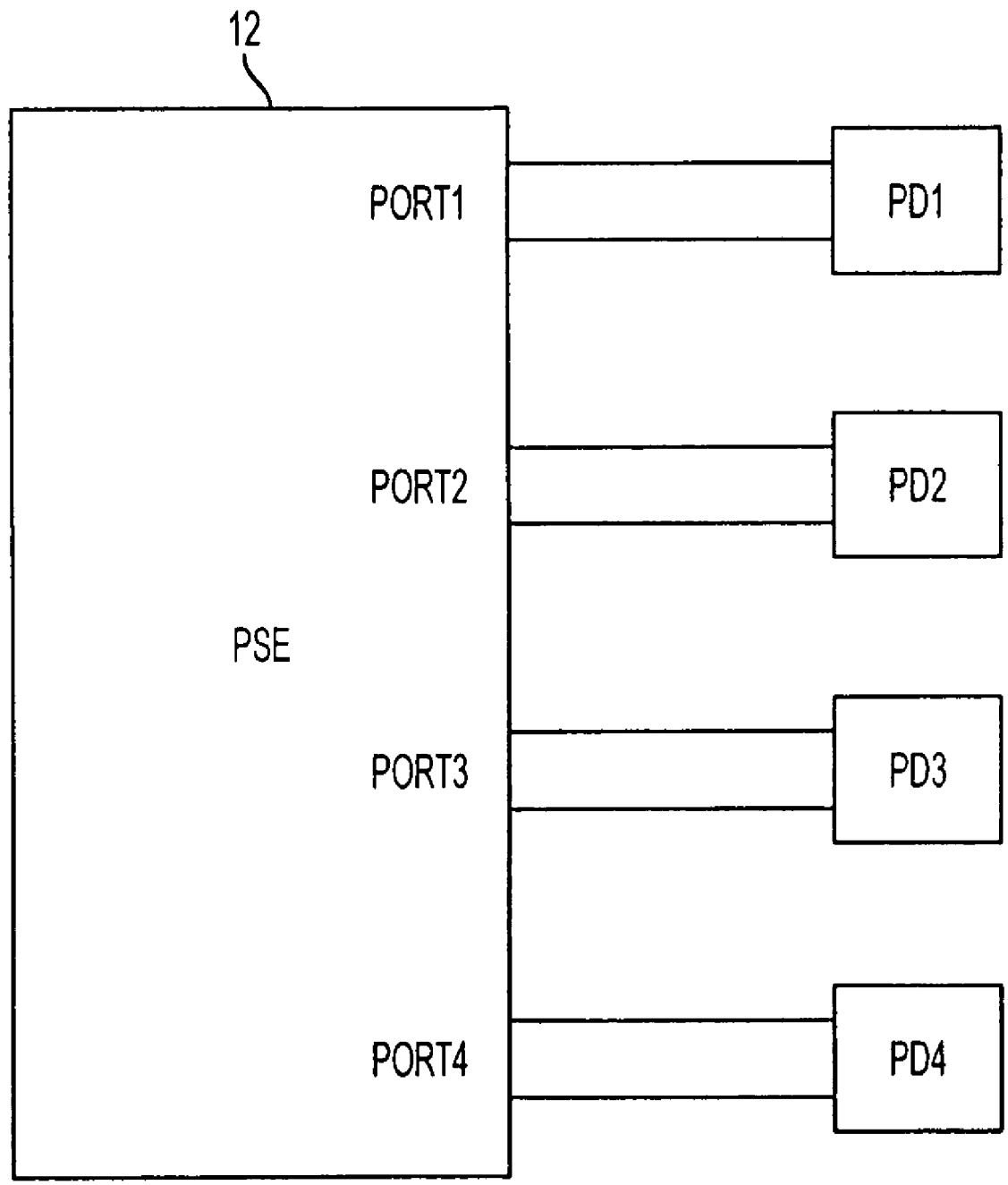
FIG. 1 is a block-diagram illustrating a PoE system of the present disclosure.

FIG. 1 shows a simplified block-diagram illustrating a Power over Ethernet (PoE) system 10 including Power Sourcing Equipment (PSE) 12 having multiple ports 1 to 4 connectable to Powered Devices (PD) 1 to 4 via respective links, each of which may be provided using 2 or 4 sets of twisted pairs within the Ethernet cable. Although FIG. 1 shows four ports of the PSE 12, one skilled in the art would realize that any number of ports may be provided.

The PSE 12 may interact with each PD in accordance with the IEEE 802.3af standard. In particular, the PSE 12 and the PD participate in the PD detection procedure, during which the PSE 12 probes a link to detect the PD. If the PD is detected, the PSE 12 checks the PD detection signature to determine whether it is valid or non-valid. The valid and non-valid detection signatures are defined in the IEEE 802.3af standard. While the valid PD detection signature indicates that the PD is in a state where it will accept power, the non-valid PD detection signature indicates that the PD is in a state where it will not accept power.

If the signature is valid, the PD has an option of presenting a classification signature to the PSE to indicate how much power it will draw when powered up. For example, a PD may be classified as class 0 to class 4. A PD of class 1 requires that the PSE supplies at least 4.0 W, a PD of class 2 requires that the PSE supplies at least 7.0 W, and a PD of class 0, 3 or 4 requires at least 15.4 W. Based on the determined class of the PD, the PSE applies the required power to the PD. When power is supplied to the PD, the PSE 12 may monitor the port current.

Figure 2:
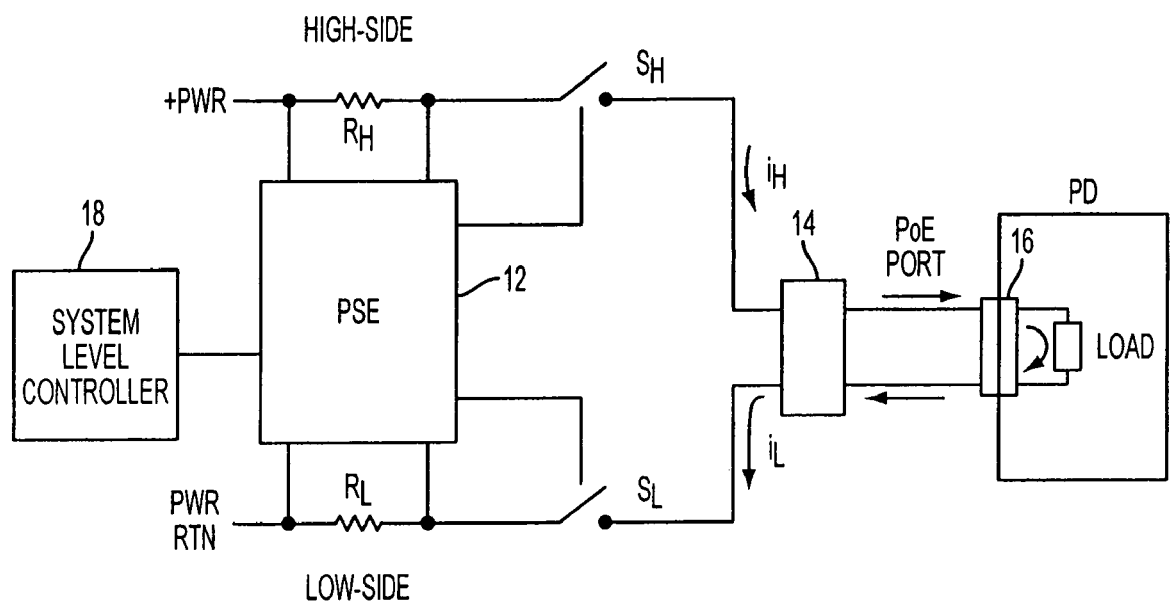
FIG. 2 is a diagram schematically illustrating a current sensing mechanism of the present disclosure.

FIG. 2 schematically illustrate a current sensing mechanism of the present disclosure. The PSE 12 is associated with high-side DC current sensing circuitry including a high-side sense resistor $R_H$, and low-side DC current sensing circuitry including a low-side sense resistor $R_L$. The high-side sense resistor $R_H$ is arranged in a high-side power supply line between the load, such as a PD, and a more positive power supply lead +PWR of a pair of power supply leads providing power supply to the PSE 12. The low-side sense resistor $R_L$ is arranged in a low-side power supply line between the load and a more negative power supply lead PWR RTN of the pair of power supply leads. For example, the high-side sense resistor $R_H$ may be connected between the load and a ground lead, whereas the low-side sense resistor $R_L$ may be connected between the load and a −48V lead. A PoE port 14 provides an interface between the PSE 12 and a respective link. A PD interface 16 couples the link to the load. Separate high-side and low-side current sensing circuits may be provided for each port of the PSE 12. Alternatively, combined current sensing circuitry may be arranged for all ports.

The high-side current sensing circuitry determines high-side DC current $i_H$ flowing between the load and the more positive lead, for example, by measuring voltage across the high-side resistor $R_H$. The low-side current sensing circuitry determines low-side DC current $i_L$ flowing between the load and the more negative lead, for example, by measuring voltage across the low-side resistor $R_L$.

The high-side and low-side sense resistors $R_H$ and $R_L$ may be arranged externally with respect to the PSE chip. Alternatively, they may be provided on the PSE chip. One skilled in the art would realize that any impedance circuitry may be utilized instead of sense resistors $R_H$ and $R_L$. For example, diodes may be used.

At least one switch is provided to remove power supplied from the PoE port in response to prescribed current sensing conditions. For example, a low-side switch $S_L$ may be arranged in the low-side power supply line for terminating power supply. Alternatively, a low-side switch $S_L$ may be provided for disconnecting a low-side power supply line in response to a prescribed value of the low-side current $i_L$, and a high-side switch $S_L$ may be provided for disconnecting a high-side power supply line in response to a prescribed value of the high-side current $i_H$.

The high-side and low-side switches $S_H$ and $S_L$ may be arranged externally with respect to the PSE chip. Alternatively, they may be provided on the PSE chip. Each of the switches $S_H$ and $S_L$ may be implemented using a field-effect or bipolar transistor. For example, the high-side switch $S_H$ may be a PFET transistor, and the low-side switch $S_L$ may be an NFET transistor.

When a combination of the low-side current $i_L$ measured by the low-side DC current sensing circuitry and the high-side current $i_H$ measured by the high-side DC current sensing circuitry corresponds to a prescribed value, the PSE 12 may produce an operation signal to carry out a prescribed operation. For example, a certain difference between the low-side current and the high-side current may indicate a fault condition, such as a fault in an isolation system. The PSE 12 may monitor the difference and establish a fault condition if the difference exceeds a prescribed value. The PSE 12 may provide indication of the fault condition to a user, and report the fault condition to a system-level controller 18.

In response to a reported fault condition, the system-level controller 18 may initiate removing power from the PoE port 14, for example, by disconnecting the low-side switch $S_L$. Alternatively, the PSE 12 may autonomously carry out a power removing operation when a fault condition is established, and provide a report to the system-level controller 18 that power is removed due to a fault condition.

Moreover, instead of calculating a difference between the high-side and low-side currents, the PSE 12 may enable the system-level controller 18 to read results of high-side and low-side current measurements. In this case, the system-level controller 18 monitors a difference between the currents $i_H$ and $i_L$ to establish a fault condition if the difference exceeds a prescribed value. In response to the fault condition, the system-level controller 18 may initiate cutting off power from the PSE 12.

Further, the current sensing mechanism of the present disclosure may be utilized for detecting a type of the PD coupled to the PSE 12 and/or for detecting a fault in that PD. For example, a certain difference between the currents $i_H$ and $i_L$ may indicate that the PD is a device with an earth ground connection, such as a radio device with an earth ground antenna. For an IEEE 802.3af standard-compliant PD, the PSE 12 may detect a fault condition in the PD, if a difference between the currents $i_H$ and $i_L$ exceeds a prescribed value. A detected type of a PD and/or a detected PD fault condition may be reported to the system-level controller 18 and/or the user.

Moreover, the current sensing mechanism of the present disclosure may be used for monitoring an intentional unbalance between the low-side and high-side currents created by the PSE 12 and/or the PD connected to the PSE 12. Also, such an intentional unbalance may be caused by the system-level controller 18. For example, the intentional unbalance between the currents $i_H$ and $i_L$ may be produced to transmit information from the PSE 12 to the respective PD and/or from the PD to the PSE.

Although PSE and PD are non-data entities, which are not involved in transmission of Ethernet data, it may be desirable in some cases to provide data transmission between the PSE and the PD, for example, for identification purposes. To provide data transmission, the PSE and/or PD may control a difference between the low-side current and the high-side current to represent data to be transmitted. One skilled in the art would realize that any circuit that creates a controlled unbalance between currents in high-side and low-side power supply lines, such as impedance-modulating circuitry, may be utilized for providing a data transmission protocol based on an unbalance between the currents $i_H$ and $i_L$.

Such a "current unbalance" data transmission protocol may be used, for example, by a high-power PSE capable of providing higher power than the IEEE 802.3af standard requires. Using data transmission to a PSE, the PD may identify itself as a device requesting higher power than a regular PSE is required to provide. If the PSE receiving the PD data is a high-power PSE, it replies to the PD data by sending data acknowledging the request for higher power, and provides the power requested by the PD.

If a PD that uses the "current unbalance" data transmission protocol is connected to a legacy PSE that does not understand this protocol, the legacy PSE continues to provide power to the PD but does not respond to the data transmitted by the PD. In this case, the PD recognizes that the PSE does not support the "current unbalance" data transmission protocol, and modifies its operation, if appropriate, to work with a legacy PSE.

Similarly, if a PSE that incorporates the "current unbalance" data transmission protocol applies power to a PD and does not receive any data from the PD, the PSE recognizes that the respective PD is a legacy PD, which does not support the "current unbalance" data transmission protocol. In this case, the PSE refrains from transmitting data to the PD.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A system for supplying power over a communication link, comprising:
   high-side current sensing circuitry for measuring a high-side current value,
   low-side current sensing circuitry for measuring a low-side current value, and
   control circuitry responsive to a combination of the high-side current value and the low-side current value for detecting a fault condition in response to the high-side current value and the low-side current value.

2. The system of claim 1, wherein the power is supplied over Ethernet.

3. The system of claim 1, wherein the control circuitry is configured to detect the fault condition in response to a difference between the high-side current value and the low-side current value.

4. The system of claim 1, wherein the high-side current sensing circuitry comprises an impedance connected between a load and a more positive power supply lead of a pair of power supply leads.

5. The system of claim 1, wherein the low-side current sensing circuitry comprises an impedance connected between a load and a more negative power supply lead of a pair of power supply leads.

6. The system of claim 1, wherein the high-side current sensing circuitry and the low-side current sensing circuitry provide DC current sensing.

7. The system of claim 3, wherein the fault condition is detected when the difference between the high-side current value and the low-side current value exceeds a predetermined value.

8. The system of claim 1, wherein the power supplied over the communication link is removed when the fault condition is detected.

9. The system of claim 1, wherein the control circuitry is configured for providing an indication to a user when the fault condition is detected.

10. A system for supplying power to a load via a communication link, comprising:
    high-side current sensing circuitry for measuring a high-side current value,
    low-side current sensing circuitry for measuring a low-side current value, and
    control circuitry responsive to a combination of the high-side current value and the low-side current value for detecting information from the load.

11. The system of claim 10, wherein the control circuitry is configured for detecting an unbalance between the high-side current value and the low-side current value.

12. The system of claim 10, wherein the control circuitry is configured for detecting a type of the load based on the high-side current value and the low-side current value.

13. The system of claim 10, wherein the control circuitry is configured for detecting whether the load has an earth ground connection based on the high-side current value and the low-side current value.

14. The system of claim 10, wherein the power supply device is configured for transmitting information to the load by providing unbalance between the high-side current value and the low-side current value.

15. A system for supplying power to a load via a communication link, comprising:
    high-side current circuitry for providing a path to the load for a high-side current,
    low-side current circuitry for providing a path to the load for a low-side current value, and
    control circuitry for providing a prescribed unbalance between the high-side current and the low-side current.

16. The system of claim 15, wherein the prescribed unbalance is provided to present information to the load.

17. In a system for supplying power over a communication link to a load, a method comprising the steps of:
    sensing high-side current in high-side circuitry associated with a power supply device,
    sensing low-side current in low-side circuitry associated with the power supply device, and
    comparing the high-side current and the low-side current to detect a fault condition.

18. The method of claim 17, further comprising the step of detecting information from the load based on an unbalance between the high-side current and the low-side current.

19. The method of claim 17, further comprising the step of providing unbalance between the high-side current and the low-side current to transmit information between the power supply device and the load.

20. A local area network comprising:
    at least a pair of network nodes,
    a network hub, and
    communication cabling for connecting the network nodes to the network hub to provide data communications,
    the network hub having a power supply device for providing power to a load over the communication cabling, the power supply device including high-side current sensing circuitry for measuring a high-side current value, low-side current sensing circuitry for measuring a low-side current value, and a fault detecting circuit for detecting a fault if a difference between the high-side current value and the low-side current value exceeds a predetermined value.

21. The local area network of claim 20, wherein the power supply device is configured for providing unbalance between the high-side current value and the low-side current value to transmit information between the power supply device and the load.

22. The local area network of claim 20, wherein the power supply device is configured to determine information from the load based on a difference between the high-side current value and the low-side current value.

* * * * *